No. 884,501. PATENTED APR. 14, 1908.
A. KORN.
MEANS FOR MEASURING THE DEGREE OF EXPOSURE OF A SELENIUM CELL.
APPLICATION FILED AUG. 1, 1906.
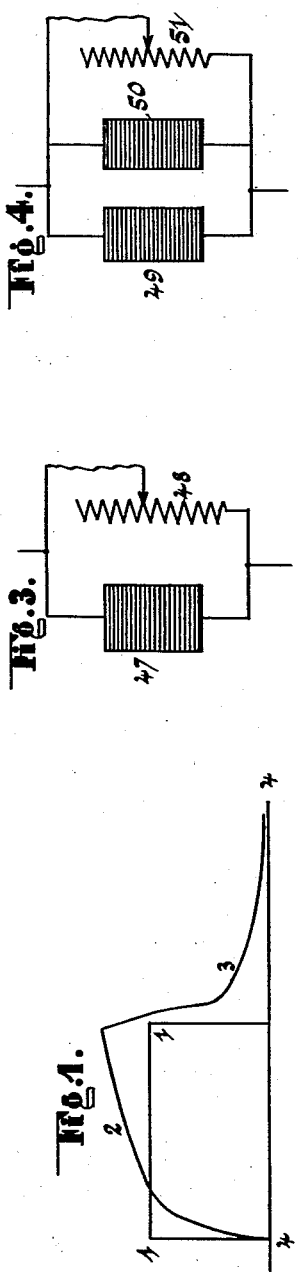
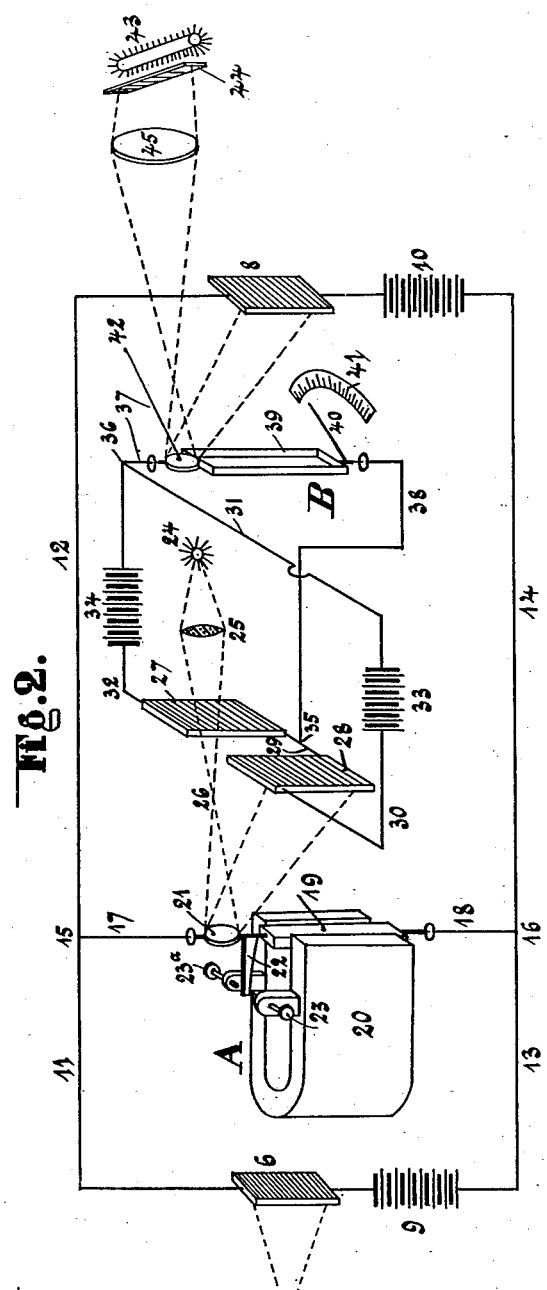
Witnesses:
Inventor:
Arthur Korn

UNITED STATES PATENT OFFICE.

ARTHUR KORN, OF MUNICH, GERMANY.

MEANS FOR MEASURING THE DEGREE OF EXPOSURE OF A SELENIUM-CELL.

No. 884,501.  Specification of Letters Patent.  Patented April 14, 1908.

Application filed August 1, 1906. Serial No. 328,813.

*To all whom it may concern:*

Be it known that I, ARTHUR KORN, a citizen of the Empire of Germany, residing at Munich, in the Empire of Germany, have invented a new and useful Means for Measuring the Degree of Exposure of a Selenium-Cell, of which the following is a specification.

My inventon consists in a new means for measuring the degree of exposure of a selenium cell, whereby it is rendered possible to produce improvements in the photometry and in other applications for which the invention may be used. A galvanometer is utilized for indicating the degree of exposure of a selenium cell to a light and the purpose of the new means is to equalize the influence of the inertia after the effect of light produced in the selenium cell upon the galvanometer.

I will now proceed to describe my invention with reference to the accompanying drawings, in which—

Figure 1 is a diagram, which will be referred to later on, Fig. 2 illustrates diagrammatically a system or means according to my invention and Figs. 3 and 4 show modifications, which will be referred to later on.

Let for instance in Fig. 1 the ordinate of the horizontal straight line 1—1 above the axis of abscissa 4—4 be the degree of intensity of a light, to which a selenium cell is exposed for a certain period indicated by the length of the line 1—1, then in general the conductivity of the cell will vary with the time, about as is indicated by the curve 2. It will be seen, that, if the degree of intensity remains constant for a certain period, the conductivity does not remain constant, as one might think, but it will increase continually in time until a certain limit. When the exposure of the cell has long ceased, the conductivity of the selenium cell will take a much longer time for its decrease as is indicated by the curve 3. In an instrument which serves for measuring the degree of exposure of a selenium cell it is of course necessary, that the variation of the conductivity with the time should have no influence upon it. I therefore according to my invention employ two separate Wheatstone bridges, each of which comprises two selenium cells and two working batteries all connected in series and one galvanometer in the bridge. The one selenium cell in the primary Wheatstone bridge I expose to the action of a light the intensity of which is to be ascertained and I place the secondary Wheatstone bridge under the control of the galvanometer in the primary Wheatstone bridge, while the other selenium cell in the latter I place under the control of the galvanometer of the secondary Wheatstone bridge. This is illustrated in Fig. 2. 5 denotes some source of light, the intensity of which is to be measured. This source of light 5 is in any known manner arranged to emit a pencil of rays of light towards a selenium cell 6. These rays of light may be for example collected by a lens 7 and sent forward in a first converging and afterwards diverging pencil (as indicated by the dotted lines) and are made to act upon the selenium cell 6 for more or less reducing its resistance. Of course the selenium cell 6 and the lens 7 may be inclosed in a suitable camera obscura (not shown) of any known construction. The selenium cell 6 is inserted in the same circuit as a second selenium cell 8 and as two storage batteries 9 and 10. The two selenium cells 6 and 8 are made as far as possible alike and are placed on the same side of the two storage batteries 9 and 10. The said circuit comprises lines 11 and 12 for connecting the two selenium cells 6 and 8 and lines 13 and 14 for connecting the two storage batteries 9 and 10. A sensitive and rapidly acting galvanometer of any known and suitable kind, for example a Deprez-d'Arsonval's galvanometer A, is shunted to the lines 11 and 12 at 15 on the one hand and to the lines 13 and 14 at 16 on the other hand by means of lines 17 and 18 as is shown. It will be seen, that the circuit 6, 11, 12, 8, 10, 14, 13 and 9 forms the four arms of a primary Wheatstone bridge, in the bridge 17, 18 of which the galvanometer A is inserted. The little frame 19 of the galvanometer A is mounted to swing between the poles of the horseshoe magnet 20 and is provided with a mirror 21 and a light arm 22. Adjusting screws 23 and 23[a] are provided on the two legs of the magnet 20 and serve as stops for limiting the deflection of the arm 22. A lamp 24 of any known construction is disposed and its rays of light are collected by a lens 25 and are sent forward in a pencil to the mirror 21 on the frame 19.

The lamp 24 and the lens 25 may be inclosed in a suitable camera obscura (not shown) of any known construction and this camera may extend to the focal point 26 or nearly so. The mirror 21 according to its position may reflect the rays of light on either of two selenium cells 27 and 28 or on both of them. The latter are made approximately alike and are inserted in a second circuit 29, 30, 31 and 32, which comprises two batteries 33 and 34 made approximately alike and connected in series. To two opposite points 35 and 36 of the circuit 29, 30, 31 and 32 between the two selenium cells 27 and 28 on the one hand and between the two batteries 33 and 34 on the other hand is shunted by means of lines 37 and 38 a galvanometer B with a rapidly swinging frame. This galvanometer B is to serve for measuring the degree of exposure of the selenium cell 6 as will be explained later on. Of this galvanometer B only the small swinging frame 39, the indicator 40, the appertaining scale 41 and the mirror 42 are shown for want of space. A lengthy lamp 43 of any known construction is disposed for emitting rays of light which pass through a plate 44 of varying transparency, whereby they are graduated in their intensity step by step or continuously, as may be desired. A lens 45 is disposed for collecting these rays of light and for sending them to the mirror 42, which in turn according to its position may reflect them towards the selenium cell 8 in such a way that according to the deflection of the galvanometer B a brighter or darker part of the graduated pencil of rays of light is thrown on the selenium cell 8. It will be seen, that the second circuit described forms a secondary Wheatstone bridge, in the bridge 37, 38 of which the galvanometer frame 39 is inserted. The lamp 43, the plate 44 and the lens 45 may be inclosed in a suitable camera obscura (not shown), which may extend to the focus or nearly so.

The voltage of the batteries 9 and 10 in the primary Wheatstone bridge is so proportioned that for a certain degree of exposure of the selenium cell 6, for instance in its state of non-exposure, there is no drop of potential in the bridge 17, 18 between the two points 15 and 16. Then the little frame 19 will be without current and its arm 22 will occupy its middle position between the two stops 23 and 23ª, while the mirror 21 will so reflect the rays of light from the lamp 24, that most of the rays will pass between the two selenium cells 27 and 28, while the remaining rays of light will act upon both cells in approximately the same degree. It will be seen, that in this case the secondary Wheatstone bridge will be in equilibrium and the small galvanometer frame 39 will be without current, so that its indicator 40 will point at zero of the scale 41, while the rays of light reflected from the mirror 42 will not fall on the selenium cell 8. Thus the two selenium cells 6 and 8 in the primary Wheatstone bridge will simultaneously remain intact.

For the purpose of photometry the system may operate for example as follows: The source of light to be measured is placed at 5 and the lens 7, which may be assumed to be covered with a suitable cap (not shown), is uncovered by taking off this cap. Then the light 5 will act upon the selenium cell 6 to reduce its resistance, so that the equilibrium of the primary Wheatstone bridge will disappear and a current will pass through the bridge 17, 18 from the juncture 15 to the other juncture 16 and therefore this current will also pass through the small galvanometer frame 19. In consequence of this the frame 19 will be turned, for example in such a manner, that its arm 22 will bear against the stop 23ª. The latter is so adjusted, that for this position of the arm 22 the selenium cell 28 will be fully exposed. Then the equilibrium of the secondary Wheatstone bridge will disappear and a current will instantaneously pass through the bridge 37, 38 and the frame 39 from the juncture 36 to the other juncture 35 and the frame 39 will be so turned, that the rays of light reflected from the mirror 42 will act upon the selenium cell 8, the indicator 40 pointing say at the maximum value on the scale 41. The exposure of the selenium cell 8 to the rays of light from the source 43 will result in a reduction of the resistance of the selenium cell, 8, whereby the equilibrium of the primary Wheatstone bridge will be approximately reëstablished. The current passing through the galvanometer frame 19 will decrease, until the arm 22 of the latter leaves the stop 23ª. However, this arm does not quite return to its initial position so that of the selenium cell 28 a greater part corresponding to the exposure of the selenium cell 6 will remain exposed and in such a manner, that the selenium cell 8 is on the average exposed to the rays of light reflected from the mirror 42 in exactly the same degree, as the selenium cell 6. If the intensity of the light at 5 is moderate, a certain portion of the original current will continue to pass through the galvanometer frame 19, the same as a corresponding portion of the original current will continue to pass through the galvanometer frame 39, so that the indicator 40 of the latter will point at some intermediary value on the scale 41. Thereby the intensity of the light at 5 is measured. Obviously for example daylight may be permitted to permanently act upon the selenium cell 6, so that it may be measured by means of the indicator 40 on the scale 41. If the exposure of the cell 6 remains constant for a longer period, of course the conductivity of the cell 6 will increase, as explained above with reference to Fig. 1. However, at the same time also the conductivity of the selenium cell 8 will increase, since the latter is exposed in exactly the same degree as the selenium cell 6. Thus the increase or decrease of the conductivity of the selenium cell 8 will keep pace with the increase or decrease of the conductivity of the other cell 6, provided that both selenium cells 6 and 8 are nearly alike. It will be understood, that the moment the intensity of the light at 5 decreases, the resistance of the selenium cell 6 will increase, so that the equilibrium of the primary Wheatstone bridge will disappear and a current will pass in the opposite direction from the juncture 16 through the bridge 18, 17 and the galvanometer frame 19 to the other juncture 15. In consequence of this the small frame 19 will be turned in the opposite direction, so that its arm 22 will bear on the other stop 23 and the other selenium cell 27 will be fully exposed to the rays of light reflected from the mirror 21. Thereby the resistance of the selenium cell 27 will be reduced, so that a current will pass in the opposite direction through the bridge 38, 37 and the small galvanometer frame 39 from the juncture 35 to the other juncture 36, so that the small galvanometer frame 39 will be turned back and therewith also its indicator 40. The rays of light reflected from the mirror 42 will be turned off from the selenium cell 8, so that the resistance of the latter will increase, whereupon the arm 22 of the galvanometer frame 19 will leave the stop 23 and the mirror 21 will turn the reflected rays of light and throw them on both selenium cells 28 and 27 in proportion to the intensity of the light at 5. The said oscillations of the indicator 40 on the intensity of the light at 5 changing are only momentary whereupon its position will remain unaltered in spite of the increase or decrease of the conductivity of both selenium cells 6 and 8, so that the galvanometer B in the secondary Wheatstone bridge that is its indicator 40 will indicate the correct degree of exposure of the selenium cell 6, in other words the intensity of the light at 5.

The whole system shown at Fig. 2 may have any extension as may be required. It may be reduced to a narrow compass and be disposed in some portable box, on the outside of which the indicator 40 and the scale 41 are arranged. Or the system may comprise two distant stations, of which one receives the selenium cell 6, the battery 9 and the lens 7, while the other station receives the bridge 17, 18 and the other part of the primary Wheatstone bridge and the whole secondary Wheatstone bridge. The two stations may be connected by two parallel lines of transmission 11 and 13 or by one only of these two lines while the other line is replaced by earth plates and the earth. In this case it will be possible to make the intensity of the light to be measured at the distant station known to the other station.

The sensitiveness of the galvanometer A is so great, that its arm 22 will already travel the path from the one stop 23 to the other one 23ª or vice versa, if the frame 19 is passed through by a current of a strength less than one twentieth of the maximum, while the full exposure to the pencil of rays of light reflected from the mirror 21 will change from the selenium cell 28 to the other selenium cell 27 or vice versa.

I have assumed the system shown at Fig. 2 to comprise four single selenium cells, but it is evident, that each of them may be replaced by a system of selenium cells and resistances, for example by a selenium cell 47 connected in multiple with an adjustable resistance 48 as shown in Fig. 3 or by two selenium cells 49 and 50 connected in multiple with an adjustable resistance 51 as shown at Fig. 4. Thereby it is rendered possible to adjust the resistance of each selenium cell to a nicety.

I claim:

1. In a means for measuring the degree of exposure of a selenium cell, the combination with two selenium cells, of two sources of current separately connected with said two selenium cells, a line connecting said two selenium cells, a line connecting said two sources of current in series, a conductor connecting said two lines, means for exposing one of said two selenium cells to the light to be measured, and a galvanometer in said conductor and adapted to control the exposure of the other selenium cell to a constant source of light in accordance with that of the first selenium cell.

2. In a means for measuring the degree of exposure of a selenium cell, the combination with two selenium cells, of two sources of current separately connected with said two selenium cells, a line connecting said two selenium cells, a line connecting said two sources of current in series, a conductor connecting said two lines, means for exposing one of said two selenium cells to the light to be measured, a device adapted to deflect a graduated pencil of rays of light to the second selenium cell, and a galvanometer in said conductor and adapted to control said device so that the exposure of the second selenium cell may correspond to that of the first selenium cell.

3. In a means for measuring the degree of exposure of a selenium cell, the combination with two systems each comprising one selenium cell and one adjustable resistance connected in series, of two sources of current separately connected with said two systems between the selenium cell and the resistance, a line connecting said two systems between the selenium cell and the resistance on the opposite side, a line connecting said two sources of current in series, a conductor connecting said two lines, means for exposing one of said two selenium cells to the light to be measured, a device adapted to deflect a graduated pencil of rays of light to the second selenium cell, and a galvanometer in said conductor and adapted to control said device so that the exposure of the second selenium cell may correspond to that of the first selenium cell.

ARTHUR KORN.

Witnesses:
ULYSSES J. BYWATER,
LOUIS F. MUELLER,
GEORG KÖRNER.